Patented Aug. 9, 1932

1,870,878

UNITED STATES PATENT OFFICE

OMAR H. SMITH, OF WEST ENGLEWOOD, NEW JERSEY, ASSIGNOR TO THE NAUGATUCK CHEMICAL COMPANY, OF NAUGATUCK, CONNECTICUT, A CORPORATION OF CONNECTICUT

PRODUCTION OF STYROLS

No Drawing.   Application filed August 22, 1930.   Serial No. 477,184.

This invention relates to improvements in the production of styrols.

It has been found that when halogenated alkyl benzols, preferably the alpha and beta halogenated alkyl benzols, are heated in the presence of a strong non-volatile acid that the acid acts as a catalyst in the removal of halogen hydride from the halogenated compounds. It has been further found that the resulting styrol if left in contact with the acid undergoes a change to a soft polymerized variety of styrol. The longer the time of contact and the greater the amount of acid present the greater is the tendency to form the soft polymerized styrol. This polymerization, however, can be avoided, when desired, to a considerable degree by carrying out the reaction which involves the liberation of halogen acid from the halogenated alkyl benzols, under a fractionating column and regulating the heat in a manner to distill off the styrol as soon as it is formed. Among strong non-volatile acids are such as sulphuric acid and phosphoric acid.

The following embodiments, in which the parts are by weight, illustrate the invention but are not to be construed as limiting thereof:

*Example 1.*—100 parts of ethyl benzol are chlorinated in the dark at 100–110° C. until approximately 15 parts of chlorine by weight are absorbed. The chlorinated mixture is fractionated and 59 parts of unchanged ethyl benzol obtained. .7 part of syrupy phosphoric acid is added to the residue after which the mixture is heated under a column in such a manner that the normal styrol distills over almost as rapidly as it is formed. 20.8 parts of distillate which boils below 165° C. and which has a styrol concentration of 36.3% are obtained.

*Example 2.*—A portion of chlorinated ethyl benzol, which had been chlorinated in the dark at approximately 100° C. is added to an excess of concentrated sulfuric acid, that is, the amount of sulphuric acid used is in excess of that required for catalyzing action only. Hydrogen chloride is evolved copiously, considerable heat is developed and the mixture becomes quite thick. The mixture is poured into an excess of water and let stand over night. A considerable quantity of soft polymerized styrol settled to the bottom of the beaker. The polymerized styrol is isolated and washed carefully with water. It has the characteristic properties of soft polymerized styrol which is usually obtained by the action of concentrated sulfuric acid on styrol solutions.

With the detailed description given above, it will be obvious that modifications will suggest themselves without departing from the principles of the invention, and it is not desired to limit the invention otherwise than as set forth in the appended claims.

Having thus described my invention, what I claim and desire to protect by Letters Patent is:

1. A method of producing a styrol from a halogenated alkyl benzol involving removal of halogen acid therefrom which comprises heating a mixture of a halogenated alkyl benzol and a strong non-volatile inorganic acid, and subsequently recovering styrol.

2. A method of producing a styrol from a halogenated alkyl benzol involving removal of halogen acid therefrom which comprises heating a mixture of a chlorinated alkyl benzol and a strong non-volatile inorganic acid, and subsequently recovering styrol.

3. A method of producing a styrol from a halogenated alkyl benzol involving removal of halogen acid therefrom which comprises heating a mixture of chlorinated ethyl benzol and a strong non-volatile inorganic acid, and subsequently recovering styrol.

4. A method of producing a styrol from a halogenated alkyl benzol involving removal of halogen acid therefrom which comprises heating a mixture of chlorinated ethyl benzol and sulphuric acid, and subsequently recovering styrol.

5. A method of producing a styrol from a halogenated alkyl benzol involving removal of halogen acid therefrom which comprises heating a mixture of chlorinated ethyl benzol and phosphoric acid, and subsequently recovering styrol.

6. A method of producing a styrol from a halogenated alkyl benzol involving removal of halogen acid therefrom which comprises heating a mixture of halogenated alkyl benzol and a strong non-volatile inorganic acid, forming normal styrol and subjecting the styrol to the action of the said acid to produce a soft polymerized styrol.

7. A method of producing a styrol from a halogenated alkyl benzol involving removal of halogen acid therefrom which comprises heating a mixture of a chlorinated alkyl benzol and a strong non-volatile inorganic acid, forming normal styrol and subjecting the styrol to the action of the said acid to produce a soft polymerized styrol.

8. A method of producing a styrol from a halogenated alkyl benzol involving removal of halogen acid therefrom which comprises heating a mixture of chlorinated ethyl benzol and a strong non-volatile inorganic acid, forming normal styrol and subjecting the styrol to the action of the said acid to produce a soft polymerized styrol.

9. A method of producing a styrol from a halogenated alkyl benzol involving removal of halogen acid therefrom which comprises treating a halogenated alkyl benzol with an excess of concentrated sulphuric acid over an amount sufficient for catalytically producing styrol and subsequently recovering a soft polymerized styrol.

10. A method of producing a styrol from a halogenated alkyl benzol involving removal of halogen acid therefrom which comprises treating chlorinated ethyl benzol with an excess of concentrated sulphuric acid over an amount sufficient for catalytically producing styrol and subsequently recovering a soft polymerized styrol.

Signed at Passaic, county of Passaic, State of New Jersey, this 18th day of August, 1930.

OMAR H. SMITH.